(12) United States Patent
Huang et al.

(10) Patent No.: US 9,240,920 B2
(45) Date of Patent: Jan. 19, 2016

(54) WIRELESS TRANSMITTER FOR MULTI-MODE CONCURRENT TRANSMISSION OF SIGNALS COMPLYING WITH DIFFERENT COMMUNICATION STANDARDS

(71) Applicant: MEDIATEK INC., Hsin-Chu (TW)

(72) Inventors: Ho-Chi Huang, Hsinchu County (TW); Chun-Hsien Peng, Nantou County (TW); Paul Cheng Po Liang, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/109,968

(22) Filed: Dec. 18, 2013

(65) Prior Publication Data

US 2014/0314184 A1  Oct. 23, 2014

Related U.S. Application Data

(60) Provisional application No. 61/814,956, filed on Apr. 23, 2013.

(51) Int. Cl.
*H04L 27/00* (2006.01)
*H04L 27/38* (2006.01)
*H04L 27/20* (2006.01)

(52) U.S. Cl.
CPC ........ *H04L 27/3854* (2013.01); *H04L 27/2053* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| | | | |
|---|---|---|---|
| 7,522,888 B2 | 4/2009 | Lu | |
| 2007/0022443 A1* | 1/2007 | Santhoff | 725/63 |
| 2011/0122972 A1* | 5/2011 | Lie et al. | 375/316 |
| 2011/0129037 A1* | 6/2011 | Staszewski et al. | 375/316 |

OTHER PUBLICATIONS

Kim, A 2.4 GHz Concurrent Radio Transceiver Architecture for Bluetooth and Wi-Fi, pp. 1151-1154, IEEE ISIE 2005, Jun. 20-23, 2005, Dubrovnik, Croatia.

\* cited by examiner

*Primary Examiner* — Adolf Dsouza
(74) *Attorney, Agent, or Firm* — Winston Hsu; Scott Margo

(57) ABSTRACT

A wireless transmitter has a digital baseband module and a radio-frequency (RF) transmitter. The digital baseband module generates a multi-mode modulated signal by using a plurality of digital synthesizers. The RF transmitter has a frequency synthesizer and a digital power amplifier (DPA). The frequency synthesizer generates an oscillation signal with an RF carrier frequency. The DPA generates a multi-standard RF signal according to the multi-mode modulated signal and the oscillation signal.

12 Claims, 7 Drawing Sheets

WIRELESS TRANSMITTER FOR MULTI-MODE CONCURRENT TRANSMISSION OF SIGNALS COMPLYING WITH DIFFERENT COMMUNICATION STANDARDS

CROSS REFERENCE TO RELATED APPLICATIONS

This application claims the benefit of U.S. provisional application No. 61/814,956, filed on Apr. 23, 2013 and incorporated herein by reference.

BACKGROUND

The disclosed embodiments of the present invention relate to signal transmission, and more particularly, to a wireless transmitter for multi-mode concurrent transmission of signals complying with different communication standards.

A multi-mode/multi-standard radio is the trend for the future. In one conventional transmitter design, two distinct radios are needed to support dual-mode concurrent transmission. In another conventional design, multiple power amplifiers, one configurable filter and one configurable mixer are needed to support dual-mode concurrent transmission. Each of the conventional transmitter designs has large chip area as well as high current consumption. Hence, it is highly desirable to have a multi-mode/multi-standard radio with smaller chip size, lowest cost and lower current consumption.

SUMMARY

In accordance with exemplary embodiments of the present invention, a wireless transmitter for multi-mode concurrent transmission of signals complying with different communication standards is proposed.

According to a first aspect of the present invention, an exemplary wireless transmitter is disclosed. The exemplary wireless transmitter has a digital baseband module and a radio-frequency (RF) transmitter. The digital baseband module is arranged to generate a multi-mode modulated signal by using a plurality of digital synthesizers. The RF transmitter has a frequency synthesizer and a digital power amplifier (DPA). The frequency synthesizer, arranged to generate an oscillation signal with an RF carrier frequency. The DPA is arranged to generate a multi-standard RF signal according to the multi-mode modulated signal and the oscillation signal.

According to a second aspect of the present invention, an exemplary wireless transmitter is disclosed. The exemplary wireless transmitter has a digital baseband module and a radio-frequency (RF) transmitter. The digital baseband module is arranged to generate a multi-mode modulated signal with different frequency offsets according to different communication standards, wherein the digital baseband module uses a digital signal combiner to output the multi-mode modulated signal. The RF transmitter has a frequency synthesizer and a digital power amplifier (DPA). The frequency synthesizer is arranged to generate an oscillation signal with an RF carrier frequency. The DPA is arranged to generate a multi-standard RF signal for different channels according to the different communication standards.

According to a third aspect of the present invention, an exemplary wireless transmitter is disclosed. The exemplary wireless transmitter has a digital baseband module and a radio-frequency (RF) transmitter. The digital baseband module is arranged to generate a plurality of single-mode modulated signals, wherein the single-mode modulated signals comprise a Wireless Fidelity (WiFi) signal and a Bluetooth (BT) signal. The RF transmitter is arranged to generate a multi-standard RF signal according to a multi-mode modulated signal, wherein the multi-mode modulated signal is generated by a signal combiner according to the single-mode modulated signals.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Because of the advance of the deep sub-micro complementary metal-oxide-semiconductor (CMOS) process, digital circuits would become smaller and consume less power. Thus, there is a strong push to convert the analog intensive radio design into more digital intensive radio designs to take full advantage of the process scaling. One exemplary embodiment of the present invention proposes using a digital radio design in a wireless transmitter for multi-mode concurrent transmission. Alternatively, the proposed digital baseband processing may collaborate with an analog radio design to achieve the multi-mode concurrent transmission. Compared to the conventional designs, the proposed wireless transmitters have smaller chip size, lowest cost and lower current consumption. Further details are described hereinafter with reference to accompanying drawings.

Figure 1:
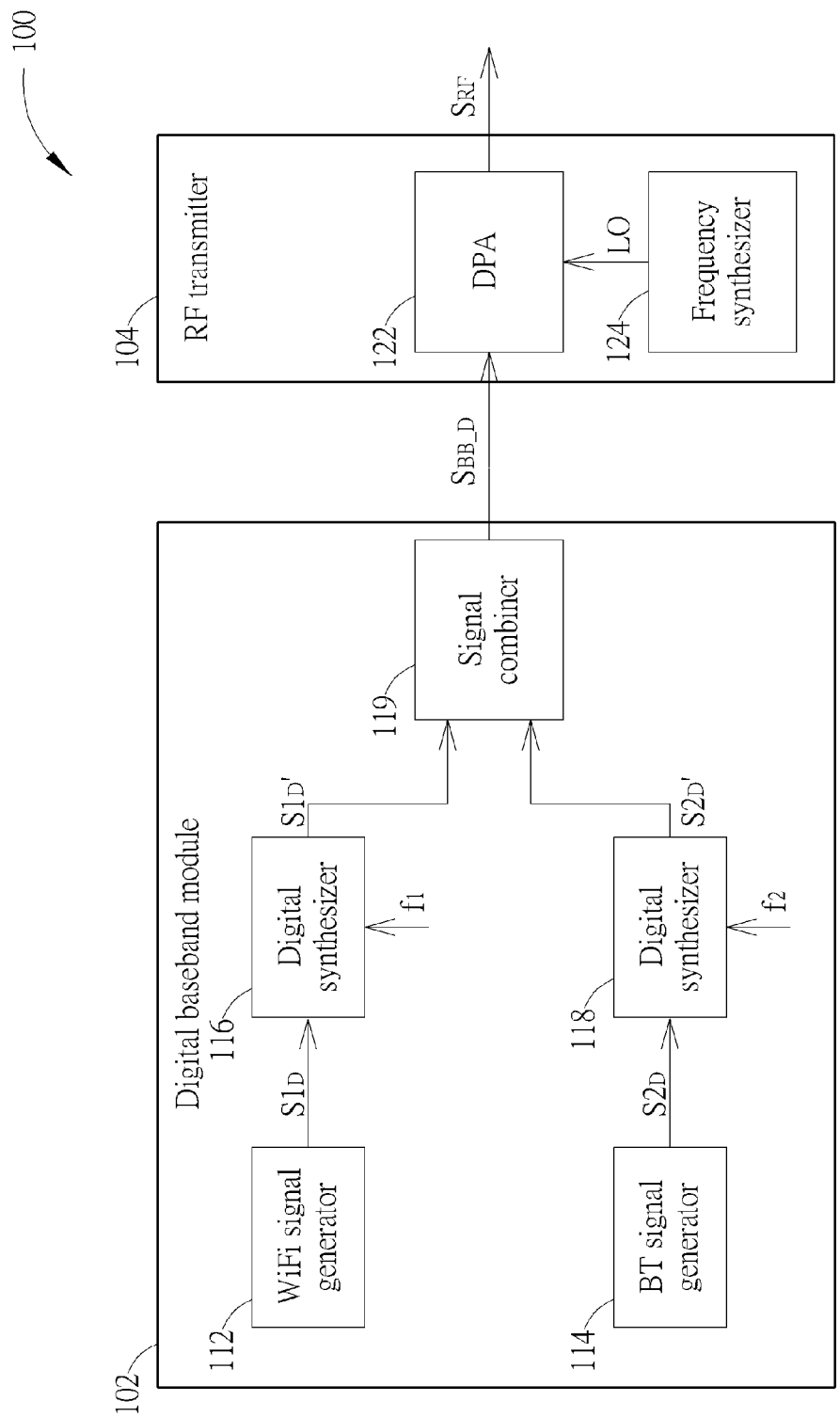
FIG. 1 is a diagram illustrating a wireless transmitter according to a first embodiment of the present invention.

FIG. 1 is a diagram illustrating a wireless transmitter according to a first embodiment of the present invention. The wireless transmitter 100 includes a digital baseband module 102 and a radio-frequency (RF) transmitter 104. The wireless transmitter 100 supports a multi-mode/multi-standard concurrent transmission such as a dual-mode concurrent transmission. Hence, the digital baseband module 102 is configured to have a plurality of baseband signal generators and a plurality of digital synthesizers, where the signal generators are used to generate a plurality of single-mode modulated signals, respectively, and the digital synthesizers are used to process the single-mode modulated signals to generate a plurality of frequency-shifted modulated signals, respectively. Consider a case where the wireless transmitter 100 is designed to perform a dual-mode concurrent transmission of a first signal complying with a first communication standard (e.g., a Wireless Fidelity (WiFi) signal) and a second signal complying with a second communication standard (e.g., a Bluetooth (BT) signal). Thus, as shown in FIG. 1, the baseband signal generators implemented in the digital baseband module 102 include a WiFi signal generator 112 and a BT signal generator 114, and the digital synthesizers implemented in the baseband signal generator 102 include one digital synthesizer 116 coupled to the WiFi signal generator 112 and another digital synthesizer 118 coupled to the BT signal generator 114. The WiFi signal generator 112 generates one single-mode modulated signal (i.e., a WiFi signal $S1_D$) to the digital synthesizer 116, and the BT signal generator 114 generates another single-mode modulated signal (i.e., a BT signal $S2_D$) to the digital synthesizer 118, where each of the WiFi signal $S1_D$ and the BT signal $S2_D$ is a digital baseband signal. Each of the WiFi signal generator 112 and the BT signal generator 114 may be realized using a conventional signal modulator design capable of generating a desired digital baseband signal. By way of example, but not limitation, the WiFi signal generator 112 may also include an up-sampler and a rate converter to adjust the sampling rate of the WiFi signal $S1_D$; similarly, the BT signal generator 114 may also include an up-sampler and a rate converter to adjust the sampling rate of the BT signal $S2_D$.

The digital baseband module 102 generates a multi-mode modulated signal $S_{BB\_D}$ with different frequency offsets (e.g., f1, f2) according to different communication standards (e.g., WiFi and BT). In this embodiment, the digital synthesizer 116 applies the frequency offset f1 to the WiFi signal $S1_D$ by multiplying an adjustment value $e^{j \cdot 2\pi \cdot f1 \cdot n \cdot fs}$ with each sample of the WiFi signal $S1_D$, where fs is the sampling frequency. Similarly, the digital synthesizer 118 applies the frequency offset f2 to the BT signal $S2_D$ by multiplying an adjustment value $e^{j \cdot 2\pi \cdot f2 \cdot n \cdot fs}$ with each sample of the BT signal $S2_D$. Each of the WiFi signal $S1_D$ and the BT signal $S_2D$ is a digital baseband signal having a frequency band centered at a DC value (i.e., 0). In other words, the WiFi signal $S1_D$ and the BT signal $S_2D$ are single-mode modulated signals having overlapping frequency bands, and would be interfered with each other if both are transmitted concurrently. To avoid the undesired interference, the digital synthesizers 116, 118 are used to make the frequency-shifted modulated signals $S1_D'$ and $S2_D'$ have non-overlapping frequency bands. In one exemplary design, the frequency offsets f1 and f2 may include a positive frequency offset and a negative frequency offset.

As shown in FIG. 1, the digital baseband module 102 further includes a signal combiner 119 coupled to the digital synthesizers 116, 118. The signal combiner 119 is a digital signal combiner used to combine the frequency-shifted modulated signals $S1_D'$ and $S2_D'$ to generate a multi-mode modulated signal $S_{BB\_D}$. In this embodiment, the multi-mode modulated signal $S_{BB\_D}$ is a dual-mode modulated signal carrying WiFi data and BT data.

Figure 2:
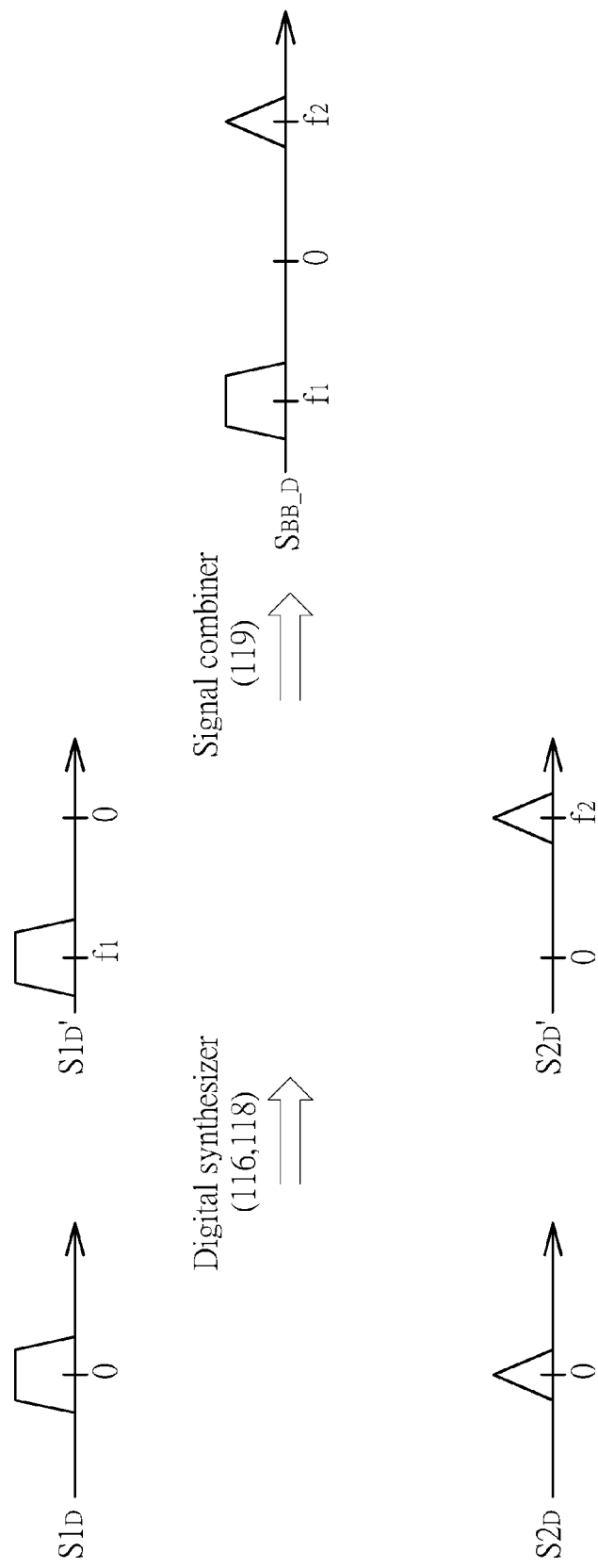
FIG. 2 is a diagram illustrating frequency spectrums of signals generated and processed by the digital baseband module shown in FIG. 1.

Please refer to FIG. 2, which is a diagram illustrating the frequency spectrums of signals generated and processed by the digital baseband module 102 shown in FIG. 1. In one exemplary design, the frequency offset f1 is a negative frequency offset smaller than the DC value, and the frequency offset f2 is a positive frequency offset larger than the DC value. Compared to an alternative design with frequency offsets f1, f2 both being positive frequency offsets or negative frequency offsets, the exemplary design shown in FIG. 2 can relax the frequency bandwidth requirement of the following RF transmitter 104.

After the multi-mode modulated signal $S_{BB\_D}$ in the baseband is generated from the digital baseband module 102, the RF transmitter 104 converts the multi-mode modulated signal $S_{BB\_D}$ into a multi-standard RF signal $F_{RF}$. In this embodiment, the RF transmitter 104 employs digital radio architecture, and includes a single digital power amplifier (DPA) 122 and a single frequency synthesizer 124. The frequency synthesizer 124 is arranged to generate an oscillation signal LO with an RF carrier frequency fc. The DPA 122 is equipped with the analog-to-digital conversion function as well as the up-conversion function. Hence, the DPA 122 generates the multi-standard RF signal $S_{RF}$ according to the multi-mode modulated signal $S_{BB\_D}$ and the oscillation signal LO. Please refer to FIG. 3, which is a diagram illustrating the frequency spectrums of signals generated and processed by the RF transmitter 104 shown in FIG. 1. With the up-conversion performed by the DPA 122, the WiFi data is transmitted via a frequency band centered at the RF frequency fc+f1, and BT data is concurrently transmitted via a frequency band centered at the RF frequency fc+f2. In this way, the interference-free dual-mode concurrent transmission is achieved.

The DPA 122 may employ either an IQ-based digital radio design or a polar-based digital radio design, depending upon actual design consideration. Compared to the polar-based digital radio design, the IQ-based digital radio design can support wider band signal transmission and can be configured more easily. Hence, to achieve concurrent transmission of signals of wideband wireless communication systems, the IQ-based digital radio design is preferably employed. However, this is not meant to be a limitation of the present invention.

Figure 4:
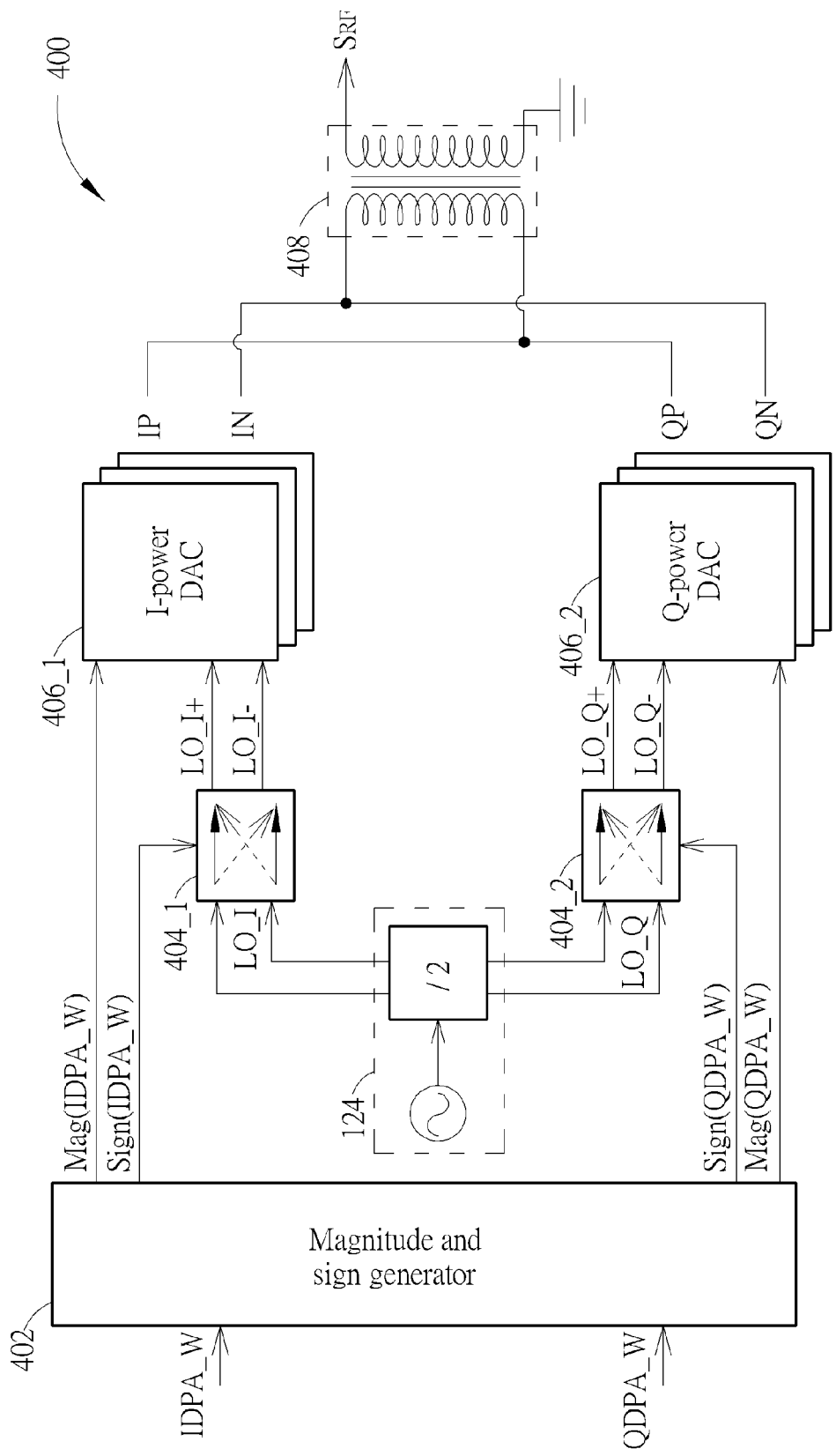
FIG. 4 is a diagram illustrating an IQ-based digital radio design according to an embodiment of the present invention.

FIG. 4 is a diagram illustrating an IQ-based digital radio design according to an embodiment of the present invention. The DPA 122 shown in FIG. 1 may be implemented using the IQ-based DPA 400 shown in FIG. 4. The IQ-based DPA 400 includes a magnitude and sign generator 402, a plurality of phase selectors 404_1, 404_2, a plurality of power digital-to-analog converters (DACs) 406_1 for the in-phase (I) channel (denoted as "I-power DAC"), a plurality of power DACs 406_2 for the quadrature (Q) channel (denoted as "Q-power DAC"), and a transformer 408. Each sample of the multi-mode modulated signal $S_{BB\_D}$ is composed of an in-phase digital word IDPA_W and a quadrature digital word QDPA_W. The magnitude and sign generator 402 extracts a sign part Sign(IDPA_W) and a magnitude part Mag(IDPA_W) of the in-phase digital word IDPA_W, and also extracts a sign part Sign(QDPA_W) and a magnitude part Mag(QDPA_W) of the quadrature digital word QDPA_W. The sign parts Sign(IDPA_W) and Sign(QDPA_W) act as control signals of the phase selectors 404_1 and 404_2, respectively. The phase selector 404_1 receives a differential in-phase oscillation input LO_I of the oscillation LO generated by the aforementioned frequency synthesizer 124, and sets the differential in-phase oscillation signals LO_I+ and LO_I− in response to the sign part Sign(IDPA_W). More specifically, when the sign part Sign(IDPA_W) has a first logic value, a positive signal and a negative signal of the differential in-phase oscillation input LO_I are output as the differential in-phase oscillation signals LO_I+ and LO_I−, respectively; and when the sign part Sign(IDPA_W) has a second logic value, the positive signal and the negative signal of the differential in-phase oscillation input LO_I are output as the differential in-phase oscillation signals LO_I− and LO_I+, respectively. Similarly, the phase selector 404_2 receives a differential quadrature oscillation input LO_Q of the oscillation signal LO generated by the aforementioned frequency synthesizer 124, and sets the differential quadrature oscillation signals LO_Q+ and LO_Q− in response to the sign part Sign(QDPA_W). More specifically, when the sign part Sign(QDPA_W) has a first logic value, a positive signal and a negative signal of the differential quadrature oscillation input LO_Q are output as the differential quadrature oscillation signals LO_Q+ and LO_Q−, respectively; and when the sign part Sign(QDPA_W) has a second logic value, the positive signal and the negative signal of the differential quadrature oscillation input LO_Q are output as the differential quadrature oscillation signals LO_Q− and LO_Q+, respectively.

Figure 5:
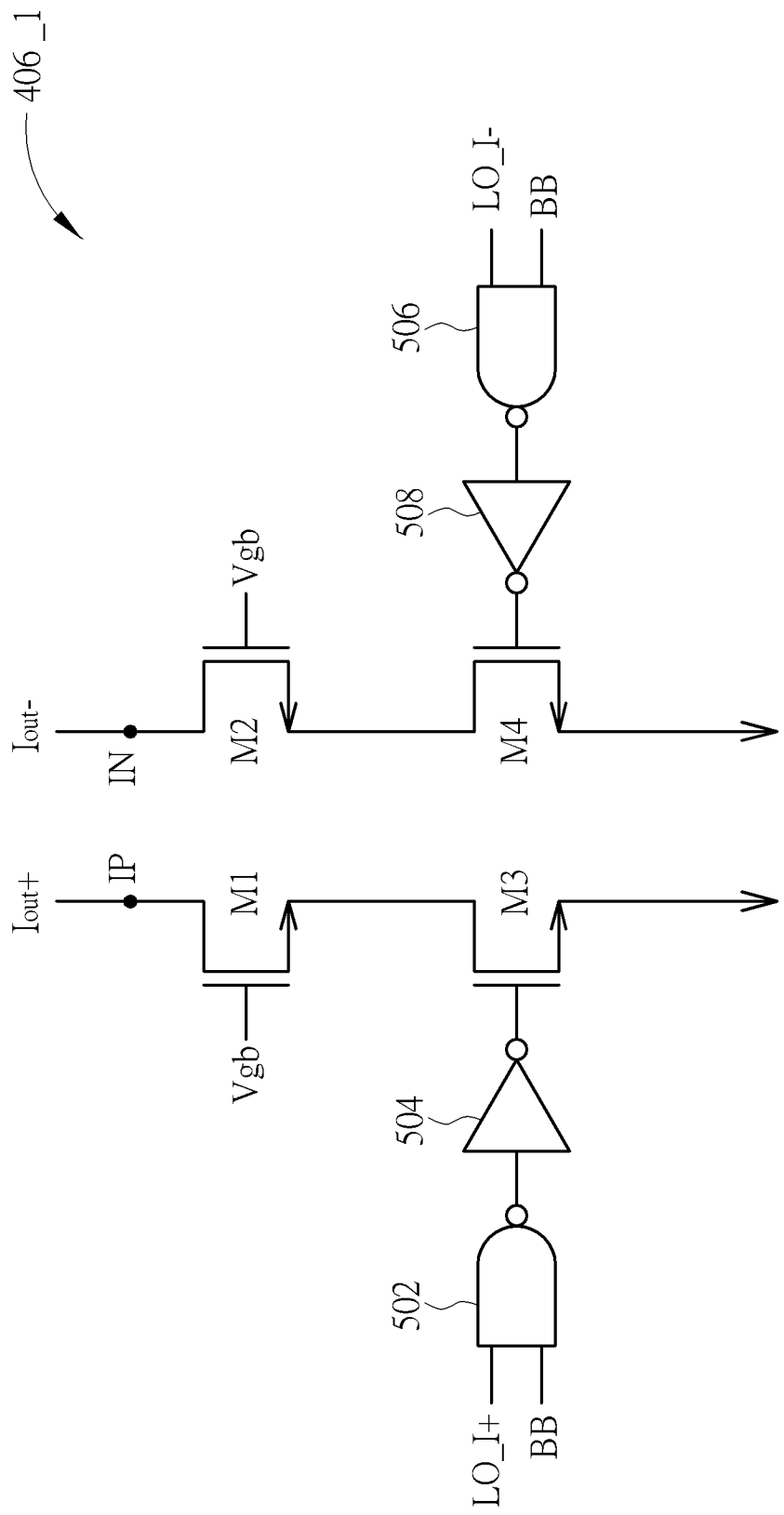
FIG. 5 is a diagram illustrating an exemplary circuit design of one power DAC shown in FIG. 4.

The power DACs 406_1 are controlled by digital bits of the magnitude part Mag(IDPA_W) and the differential in-phase oscillation signals LO_I− and LO_I+, and generate output currents to a positive output node IP and a negative output node IN. Similarly, the power DACs 406_2 are controlled by digital bits of the magnitude part Mag(QDPA_W) and the differential quadrature oscillation signals LO_Q− and LO_Q+, and generate output currents to a positive output node QP and a negative output node QN. Since the power DACs 406_1 and 406_2 have the same circuit structure, an exemplary circuit design of one power DAC 406_1 is shown in FIG. 5 for illustrative purposes. The transistors M1 and M2 are both biased by a bias voltage Vgb. The transistor M3 is controlled by the oscillation signal LO_I+ and a digital input BB (which is derived from the magnitude part Mag(IDPA_W)) through a combination logic composed of an NAND gate 502 and a NOT gate 504. The transistor M4 is controlled by the oscillation signal LO_I− and the same digital input BB through a combination logic composed of an NAND gate 506 and a NOT gate 508. Based on the on/off statuses of the transistors M3 and M4, the current outputs $I_{out}+$ and $I_{out}-$ are generated to the positive output node IP and the negative output node IN.

The output currents of the power DACs 406_1, 406_2 at the positive output nodes IP and QP are summed up, and output currents of the power DACs 406_1, 406_2 at the negative output nodes IN and QN are summed up. The transformer 408 is used to convert a differential voltage input resulting from the output currents of the power DACs 406_1, 406_2 into a single-ended voltage output (i.e., RF signal $S_{RF}$) to be transmitted over the air via an antenna (not shown).

Figure 6:
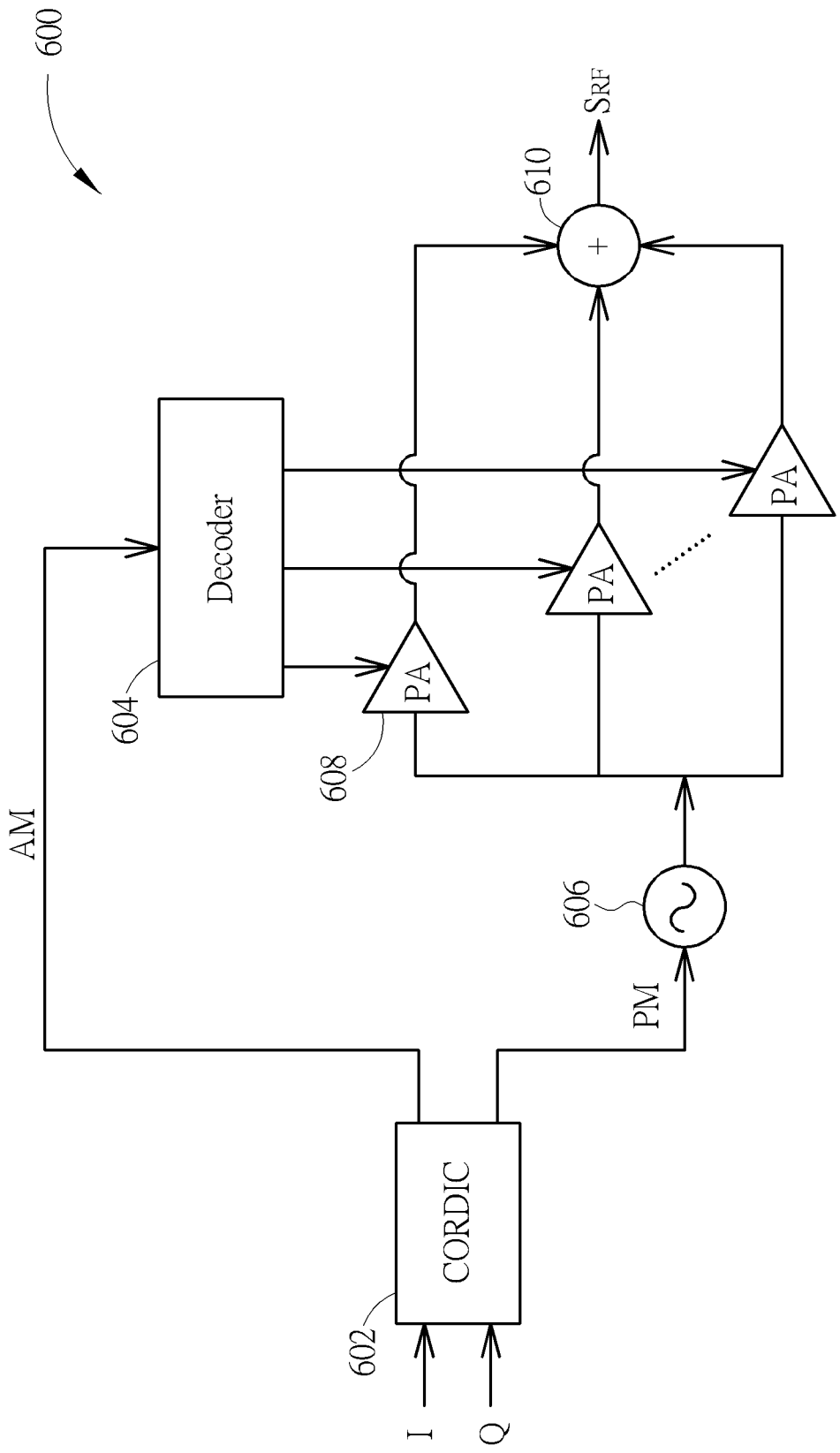
FIG. 6 is a diagram illustrating a polar-based digital radio design according to an embodiment of the present invention.

FIG. 6 is a diagram illustrating a polar-based digital radio design according to an embodiment of the present invention. The DPA 122 shown in FIG. 1 may be implemented using the polar-based DPA 600 shown in FIG. 6. The polar-based DPA 600 includes a coordinate rotation digital computer (CORDIC) 602, a decoder 604, a controllable oscillator 606, a plurality of power amplifiers 608, and a signal combiner 610. Each sample of the multi-mode modulated signal $S_{BB\_D}$ is composed of an in-phase digital word I and a quadrature digital word Q. The CORDIC 602 converts the in-phase digital word I and the quadrature digital word Q in a Cartesian coordinate system into a digital amplitude modulation part AM and a digital phase modulation part PM in a polar coordinate system. The digital phase modulation part PM controls the controllable oscillator 606 to generate an RF input to each of the power amplifiers 608. The digital amplitude modulation part AM is processed by the decoder 604 to determine how many power amplifiers 608 should be enabled. The outputs of the enabled power amplifiers 608 are combined at the signal combiner 610 to serve as the RF signal $S_{RF}$.

It should be noted that the DPA designs shown in FIG. 4 and FIG. 5 are for illustrative purposes only, and are not meant to be limitations of the present invention. That is, any digital radio architecture capable of outputting the multi-standard RF signal $S_{RF}$ based on the multi-mode modulated signal $S_{BB\_D}$ generated by the proposed digital baseband module 102 may be employed by the RF transmitter 104. These alternative designs all fall within the scope of the present invention.

Figure 7:
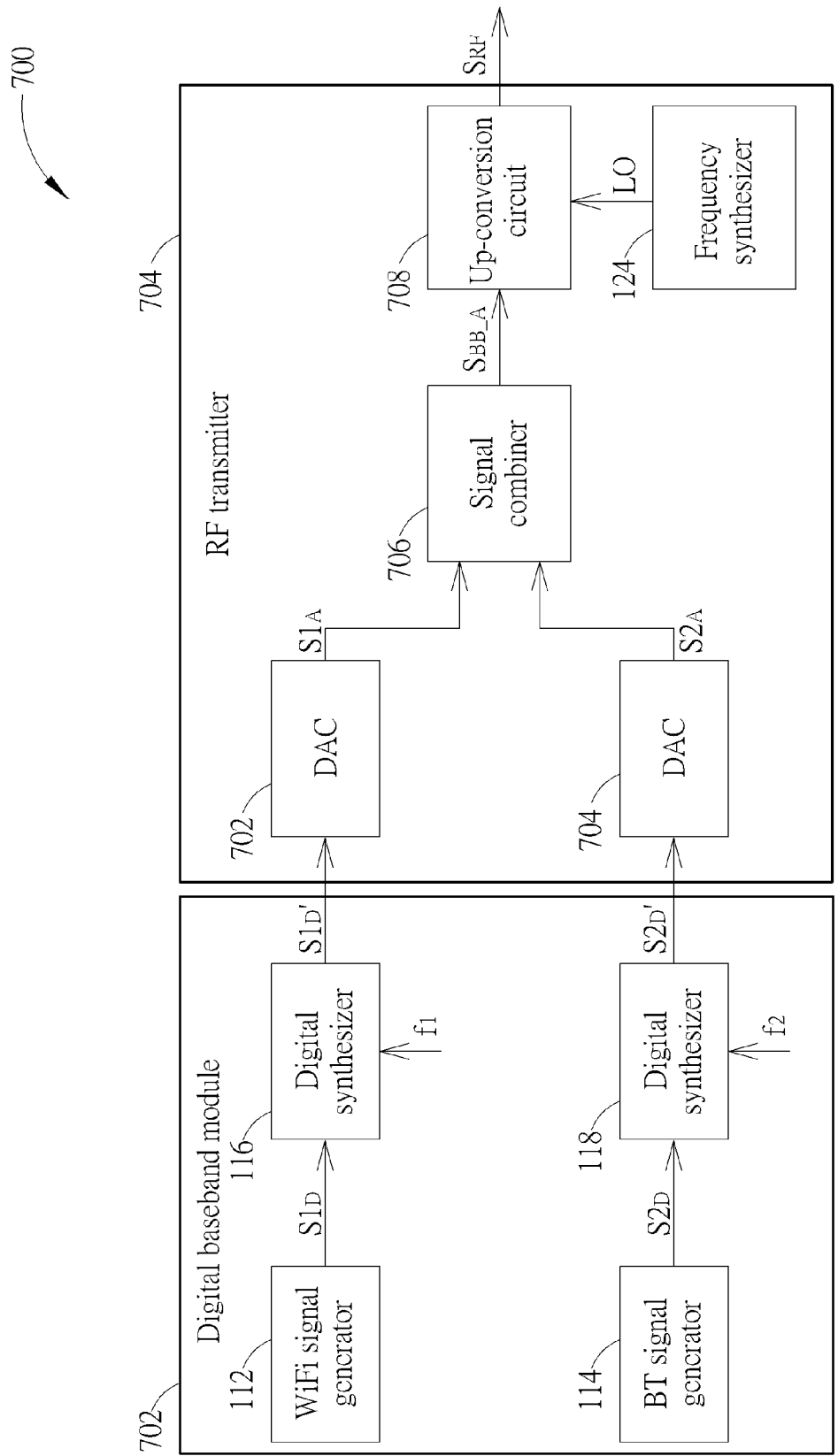
FIG. 7 is a diagram illustrating a wireless transmitter according to a second embodiment of the present invention.

In above embodiment shown in FIG. 1, the signal combination of frequency-shifted modulated signals is performed in the digital domain. In an alternative design, the signal combination of frequency-shifted modulated signals may be performed in the analog domain. Please refer to FIG. 7, which is a diagram illustrating a wireless transmitter according to a second embodiment of the present invention. The wireless transmitter 700 includes a digital baseband module 702 and an RF transmitter 704. The wireless transmitter 700 supports a multi-mode/multi-standard concurrent transmission such as a dual-mode concurrent transmission. Hence, the digital baseband module 702 is configured to have a plurality of baseband signal generators and a plurality of digital synthesizers. Consider a case where the wireless transmitter 700 is designed to perform a dual-mode concurrent transmission of a first signal complying with a first communication standard (e.g., a WiFi signal) and a second signal complying with a second communication standard (e.g., a BT signal). Thus, as shown in FIG. 7, the digital baseband module 702 is configured to have the aforementioned WiFi signal generator 112, BT signal generator 114, and digital synthesizers 116, 118. The major difference between the digital baseband modules 102 and 702 is that no digital signal combiner is implemented in the digital baseband module 702. As a person skilled in the art can readily understand details of the digital baseband module 702 after reading above paragraphs directed to the digital baseband module 102, further description is omitted here for brevity.

The RF transmitter 704 includes a plurality of DACs, a signal combiner 706, an up-conversion circuit 708 and the aforementioned frequency synthesizer 124. When the wireless transmitter 700 is designed to perform a dual-mode concurrent transmission of a first signal complying with a first communication standard (e.g., a WiFi signal) and a second signal complying with a second communication standard (e.g., a BT signal), the RF transmitter 704 is designed to have two DACs 702, 704, where the DAC 702 is arranged to convert one digital baseband signal (i.e., frequency-shifted modulated signal $S1_D{'}$) into an analog baseband signal $S1_A$, and the DAC 704 is arranged to convert another digital baseband signal (i.e., frequency-shifted modulated signal $S2_D{'}$) into an analog baseband signal $S2_A$. The signal combiner 706 is an analog signal combiner used to combine the analog baseband signals $S1_A$ and $S2_A$ to generate a multi-mode modulated signal $S_{BB\_A}$. In this embodiment, the multi-mode modulated signal $S_{BB\_A}$ is a dual-mode modulated signal carrying WiFi data and BT data, and may be regarded as an analog version of the multi-mode modulated signal $S_{BB\_D}$ shown in FIG. 1.

Figure 3:
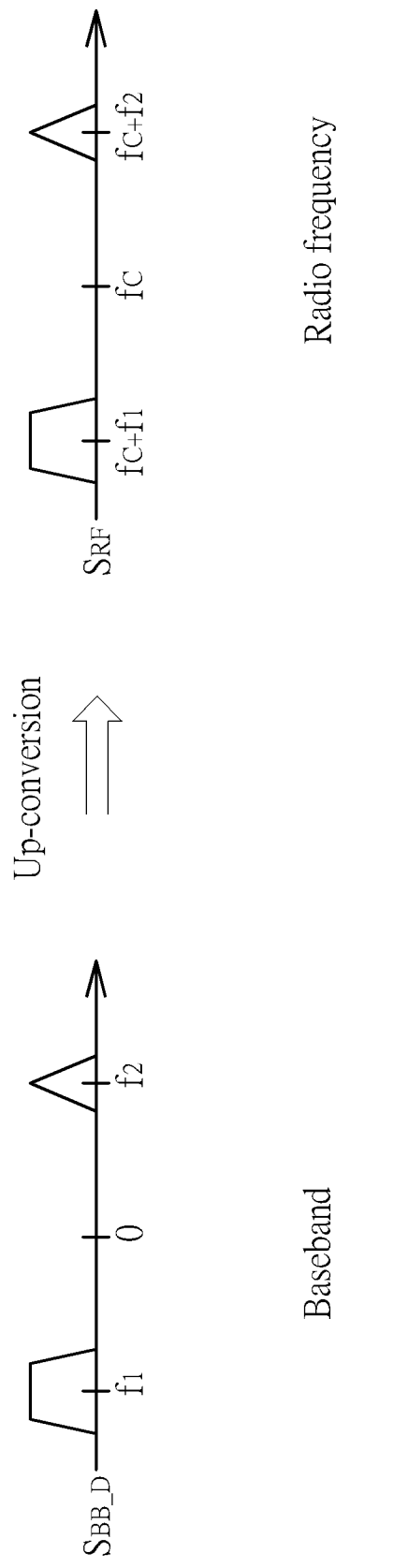
FIG. 3 is a diagram illustrating frequency spectrums of signals generated and processed by the RF transmitter shown in FIG. 1.

After the multi-mode modulated signal $S_{BB\_A}$ in the baseband is generated from the signal combiner 706, the up-conversion circuit 708 performs up-conversion upon the multi-mode modulated signal $S_{BB\_A}$ for radio transmission. In this embodiment, the RF transmitter 104 employs conventional analog radio architecture. Hence, the frequency synthesizer 124 generates an oscillation signal LO with an RF carrier frequency fc. The up-conversion circuit 708 converts the multi-mode modulated signal $S_{BB\_A}$ into a multi-standard RF signal $F_{RF}$ according to the multi-mode modulated signal $S_{BB\_A}$ and the oscillation signal LO. In this way, the same objective of transmitting the WiFi data and the BT data via non-overlapping frequency bands as shown in FIG. 3 is achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless transmitter, comprising:
 a digital baseband module, arranged to generate a plurality of frequency-shifted modulated signals by using a plurality of digital synthesizers; and
 a radio-frequency (RF) transmitter, comprising:
  a frequency synthesizer, arranged to generate an oscillation signal with an RF carrier frequency; and
  an up-conversion circuit, arranged to generate an RF signal according to the frequency-shifted modulated signals and the oscillation signal;
 wherein the digital baseband module comprises:
 a plurality of baseband signal generators, arranged to generate a plurality of single-mode modulated signals, respectively; and
 the digital synthesizers, arranged to process the single-mode modulated signals to generate the frequency-shifted modulated signals; and
 the RF transmitter further comprises:
 a plurality of digital-to-analog converters, arranged to convert the frequency-shifted modulated signals into analog baseband signals; and
 a signal combiner, arranged to combine the analog baseband signals to generate a multi-mode modulated signal to the up-conversion circuit.

2. The wireless transmitter of claim 1, wherein the frequency-shifted modulated signals have non-overlapping frequency bands.

3. The wireless transmitter of claim 1, wherein the digital synthesizers are arranged to apply different frequency offsets, respectively, the different frequency offsets comprise a positive frequency offset and a negative frequency offset, and one of the positive frequency offset and the negative frequency offset is applied to a Wireless Fidelity (WiFi) signal.

4. The wireless transmitter of claim 1, wherein the digital synthesizers are arranged to apply different frequency offsets, respectively, the different frequency offsets comprise a positive frequency offset and a negative frequency offset, and one of the positive frequency offset and the negative frequency offset is applied to a Bluetooth (BT) signal.

5. A wireless transmitter, comprising:
 a digital baseband module, arranged to generate a plurality of single-mode modulated signals, wherein the single-mode modulated signals comprise a Wireless Fidelity (WiFi) signal and a Bluetooth (BT) signal; and
 a radio-frequency (RF) transmitter, arranged to generate a multi-standard RF signal according to a multi-mode modulated signal;
 wherein the RF transmitter comprises:
  a plurality of digital-to-analog converters, arranged to convert outputs of the digital baseband modules into analog baseband signals;
  an analog signal combiner, arranged to combine the analog baseband signals to generate the multi-mode modulated signal;
  a frequency synthesizer, arranged to generate an oscillation signal with an RF carrier frequency; and
  an up-conversion circuit, arranged to generate the multi-standard RF signal according to the multi-mode modulated signal and the oscillation signal.

6. The wireless transmitter of claim 5, wherein the digital baseband module comprises:
 a plurality of baseband signal generators, arranged to generate the single-mode modulated signals, respectively; and
 a plurality of digital synthesizers, arranged to apply different frequency offsets to the single-mode modulated signals to generate a plurality of frequency-shifted modulated signals.

7. The wireless transmitter of claim 6, wherein the frequency-shifted modulated signals have non-overlapping frequency bands.

8. A wireless transmitter, comprising:
 a digital baseband module, arranged to generate a multi-mode modulated signal by using a plurality of digital synthesizers; and
 a radio-frequency (RF) transmitter, comprising:
  a frequency synthesizer, arranged to generate an oscillation signal with an RF carrier frequency; and
  a digital power amplifier (DPA), arranged to generate an RF signal according to the multi-mode modulated signal and the oscillation signal, wherein the multi-mode modulated signal fed into the DPA includes an in-phase (I) channel signal and a quadrature (Q) channel signal, and the DPA is configured to employ an IQ-based digital radio design that does not convert the I channel signal and the Q channel signal in a Cartesian coordinate system into an amplitude modulation part and a phase modulation part in a polar coordinate system.

9. The wireless transmitter of claim 8, wherein the digital baseband module generates a plurality of single-mode modulated signals, applies different frequency offsets to the single-mode modulated signals to generate a plurality of frequency-shifted modulated signals, and digitally combine the frequency-shifted modulated signals to generate the multi-mode modulated signal.

10. The wireless transmitter of claim 9, wherein the frequency-shifted modulated signals have non-overlapping frequency bands.

11. The wireless transmitter of claim 9, wherein the different frequency offsets comprise a positive frequency offset and a negative frequency offset, and one of the positive frequency offset and the negative frequency offset is applied to a Wireless Fidelity (WiFi) signal.

12. The wireless transmitter of claim 9, wherein the different frequency offsets comprise a positive frequency offset and a negative frequency offset, and one of the positive frequency offset and the negative frequency offset is applied to a Bluetooth (BT) signal.

* * * * *